United States Patent
Eigel et al.

(10) Patent No.: US 11,745,739 B2
(45) Date of Patent: Sep. 5, 2023

(54) METHOD AND DEVICE FOR SUPPORTING A LANE CHANGING PROCEDURE FOR A VEHICLE

(71) Applicant: Volkswagen Aktiengesellschaft, Wolfsburg (DE)

(72) Inventors: Thomas Eigel, Berlin (DE); Timur Aminev, Braunschweig (DE); Stefan Detering, Braunschweig (DE); Jens Hoedt, Hannover (DE); Sören Lindner, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 289 days.

(21) Appl. No.: 17/270,026

(22) PCT Filed: Sep. 18, 2019

(86) PCT No.: PCT/EP2019/075032
§ 371 (c)(1),
(2) Date: Feb. 21, 2021

(87) PCT Pub. No.: WO2020/064465
PCT Pub. Date: Apr. 2, 2020

(65) Prior Publication Data
US 2021/0331672 A1    Oct. 28, 2021

(30) Foreign Application Priority Data
Sep. 25, 2018    (DE) ............. 10 2018 216 364.2

(51) Int. Cl.
*B60W 30/14* (2006.01)
*B60K 31/00* (2006.01)
(Continued)

(52) U.S. Cl.
CPC ........ *B60W 30/143* (2013.01); *B60K 31/0008* (2013.01); *B60W 30/16* (2013.01);
(Continued)

(58) Field of Classification Search
CPC .... B60W 30/14; B60W 30/143; B60W 30/16; B60W 30/18163; B60W 40/04;
(Continued)

(56) References Cited

U.S. PATENT DOCUMENTS

| 6,842,687 B2 | 1/2005 | Winner et al. ................ 701/93 |
| 2003/0156015 A1* | 8/2003 | Winner ................ G01S 13/931 340/425.5 |

(Continued)

FOREIGN PATENT DOCUMENTS

| CN | 105667508 A | * | 6/2016 | .......... B60W 30/143 |
| CN | 112040392 B | * | 7/2021 | ............. G08G 1/161 |

(Continued)

OTHER PUBLICATIONS

German Office Action, Application No. 102018216364.2, 7 pages, dated May 15, 2019.
(Continued)

*Primary Examiner* — Atul Trivedi
(74) *Attorney, Agent, or Firm* — Slayden Grubert Beard PLLC

(57) ABSTRACT

The invention relates to a method for supporting a lane changing procedure for a vehicle with a cruise control apparatus, wherein the cruise control apparatus adjusts a speed of the vehicle to a target speed, comprising the following steps: receiving environmental data on an environment of the vehicle using an input apparatus, wherein the environmental data at least comprise information on other vehicles in a target lane, determining a current traffic density and a current flow speed in the target lane based on the
(Continued)

environmental data using an evaluation apparatus, adapting the target speed based on the determined current traffic density and the current flow speed by using the evaluation apparatus, forwarding the adapted target speed to the cruise control apparatus. The invention further relates to an associated device.

20 Claims, 3 Drawing Sheets

(51) Int. Cl.
    *B60W 30/16*     (2020.01)
    *B60W 30/18*     (2012.01)
    *B60W 40/04*     (2006.01)
    *B60W 40/105*    (2012.01)
    *B60W 50/14*     (2020.01)
    *B60W 50/00*     (2006.01)

(52) U.S. Cl.
    CPC ...... *B60W 30/18163* (2013.01); *B60W 40/04* (2013.01); *B60W 40/105* (2013.01); *B60W 50/14* (2013.01); *B60K 2310/244* (2013.01); *B60W 2050/0083* (2013.01); *B60W 2050/146* (2013.01); *B60W 2554/406* (2020.02); *B60W 2554/80* (2020.02)

(58) Field of Classification Search
    CPC ............... B60W 40/105; B60W 50/14; B60W 2050/0083; B60W 2050/146; B60W 2554/406; B60W 2554/80; B60W 2720/10; B60K 31/0008; B60K 2310/244; G08G 1/167
    USPC .......................................................... 701/93
    See application file for complete search history.

(56) References Cited

U.S. PATENT DOCUMENTS

| | | | |
|---|---|---|---|
| 2005/0015203 A1* | 1/2005 | Nishira | B60W 50/16 340/436 |
| 2006/0009910 A1* | 1/2006 | Ewerhart | B60W 30/143 701/96 |
| 2006/0095195 A1* | 5/2006 | Nishimura | B60W 30/025 701/96 |
| 2007/0109111 A1* | 5/2007 | Breed | G08G 1/096783 340/435 |
| 2009/0276135 A1 | 11/2009 | Hagemann et al. | 701/96 |
| 2013/0345944 A1* | 12/2013 | Kasiraj | B60W 30/16 701/1 |
| 2014/0074356 A1* | 3/2014 | Bone | G08G 1/167 701/41 |
| 2014/0371981 A1 | 12/2014 | Nordbruch et al. | 701/36 |
| 2015/0166062 A1* | 6/2015 | Johnson | B60W 10/20 701/41 |
| 2015/0194055 A1* | 7/2015 | Maass | B60W 30/18163 340/905 |
| 2017/0101097 A1* | 4/2017 | Buchner | B60W 30/16 |
| 2017/0232970 A1* | 8/2017 | Schaper | G08G 1/167 701/36 |
| 2017/0327116 A1* | 11/2017 | Heo | B60W 30/16 |
| 2018/0001892 A1* | 1/2018 | Kim | B60W 30/16 |
| 2018/0046191 A1 | 2/2018 | Keller et al. | |
| 2019/0051159 A1* | 2/2019 | Wang | G05D 1/0088 |
| 2019/0329777 A1* | 10/2019 | Rajab | B60W 50/0097 |
| 2019/0329778 A1* | 10/2019 | D'sa | B62D 15/0255 |
| 2019/0329779 A1* | 10/2019 | D'sa | G06N 20/20 |
| 2020/0290619 A1* | 9/2020 | Mehdi | B60W 60/0011 |
| 2021/0197858 A1* | 7/2021 | Zhang | B60W 30/0956 |
| 2021/0300348 A1* | 9/2021 | Yasui | B60W 60/0011 |
| 2022/0013014 A1* | 1/2022 | Xu | G01C 21/3697 |
| 2022/0048513 A1* | 2/2022 | Xu | B60W 60/00276 |
| 2022/0080972 A1* | 3/2022 | Chen | G06V 20/58 |
| 2022/0153262 A1* | 5/2022 | Gallo | G01S 7/417 |
| 2022/0314990 A1* | 10/2022 | Han | B60W 30/1882 |
| 2023/0050759 A1* | 2/2023 | Borhan | B60K 35/00 |

FOREIGN PATENT DOCUMENTS

| | | | | |
|---|---|---|---|---|
| DE | 10114187 A1 | | 9/2002 | ............ B60K 31/00 |
| DE | 10321412 A1 | | 12/2004 | ............ B60K 31/00 |
| DE | 102005026065 A1 | | 12/2006 | ............ B60K 31/00 |
| DE | 102009015170 A1 | * | 10/2009 | ............ B60W 30/16 |
| DE | 102014000843 A1 | | 8/2014 | ............ B60W 30/08 |
| DE | 102013210941 A1 | | 12/2014 | ............ B60W 40/09 |
| DE | 102014217846 A1 | | 3/2016 | ............ B60W 30/08 |
| DE | 102015223656 A1 | | 6/2017 | ............ G08G 1/0968 |
| DE | 102018107341 A1 | | 10/2018 | ............ B60W 30/08 |
| DE | 102018216364 B4 | | 7/2020 | ............ B60W 10/04 |
| DE | 102020117160 B3 | * | 10/2021 | |
| EP | 2216197 A1 | * | 8/2010 | ............ B60W 30/16 |
| EP | 3144197 A1 | * | 3/2017 | ............ B60W 10/04 |
| EP | 3281830 A1 | | 2/2018 | ............ B60W 30/02 |
| EP | 3971859 A1 | * | 3/2022 | ............ B60W 30/12 |
| FR | 2840857 A1 | * | 12/2003 | ......... B60K 31/0008 |
| GB | 2401956 A | | 11/2004 | ............ B60K 31/00 |
| GB | 2563127 A | | 12/2018 | ............ B60W 30/14 |
| KR | 20170041068 A | * | 4/2017 | ............ B60W 30/12 |
| WO | WO-2009074656 A1 | * | 6/2009 | ............ B60W 30/16 |
| WO | WO-2010045903 A1 | * | 4/2010 | ............ B60W 30/17 |
| WO | WO-2011158307 A1 | * | 12/2011 | ...... B60W 30/18163 |
| WO | WO-2012041869 A2 | * | 4/2012 | ............ B60W 30/16 |
| WO | WO-2014204381 A1 | * | 12/2014 | .......... B60W 30/143 |
| WO | WO-2015116950 A1 | * | 8/2015 | ............ B60K 31/00 |
| WO | 2015/176723 A1 | | 11/2015 | ............ B60W 30/14 |
| WO | 2020/064465 A1 | | 4/2020 | ............ B60K 31/00 |
| WO | WO-2021165373 A1 | * | 8/2021 | .......... B60W 30/143 |

OTHER PUBLICATIONS

International Search Report and Written Opinion, Application No. PCT/EP2019/075032, 6 pages, dated Dec. 19, 2019.

* cited by examiner

...

METHOD AND DEVICE FOR SUPPORTING A LANE CHANGING PROCEDURE FOR A VEHICLE

CROSS-REFERENCE TO RELATED APPLICATIONS

This application claims priority to German Patent Application No. DE 10 2018 216 364.2, filed on Sep. 25, 2018 with the German Patent and Trademark Office. The contents of the aforesaid patent application are incorporated herein for all purposes.

TECHNICAL FIELD

The invention relates to a method and a device for supporting a lane changing procedure for a vehicle with a cruise control apparatus.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern vehicles are equipped with numerous assistance systems that support a driver in driving the vehicle. For example, cruise control apparatuses are known that adjust the speed of the vehicle to a target speed. Furthermore, overtaking assistance systems are known that can support a driver in the overtaking procedure.

However, supporting a lane changing procedure is currently only solved to an unsatisfactory extent.

SUMMARY

An object exists of creating a method and a device for supporting a lane changing procedure in which a supportive function can be better provided.

The object is solved by a method and a device according to the independent claims. Embodiments of the invention are discussed in the dependent claims and the following description.

The details of one or more embodiments are set forth in the accompanying drawings and the description below. Other features will be apparent from the description, drawings, and from the claims.

DESCRIPTION

Figure 1:
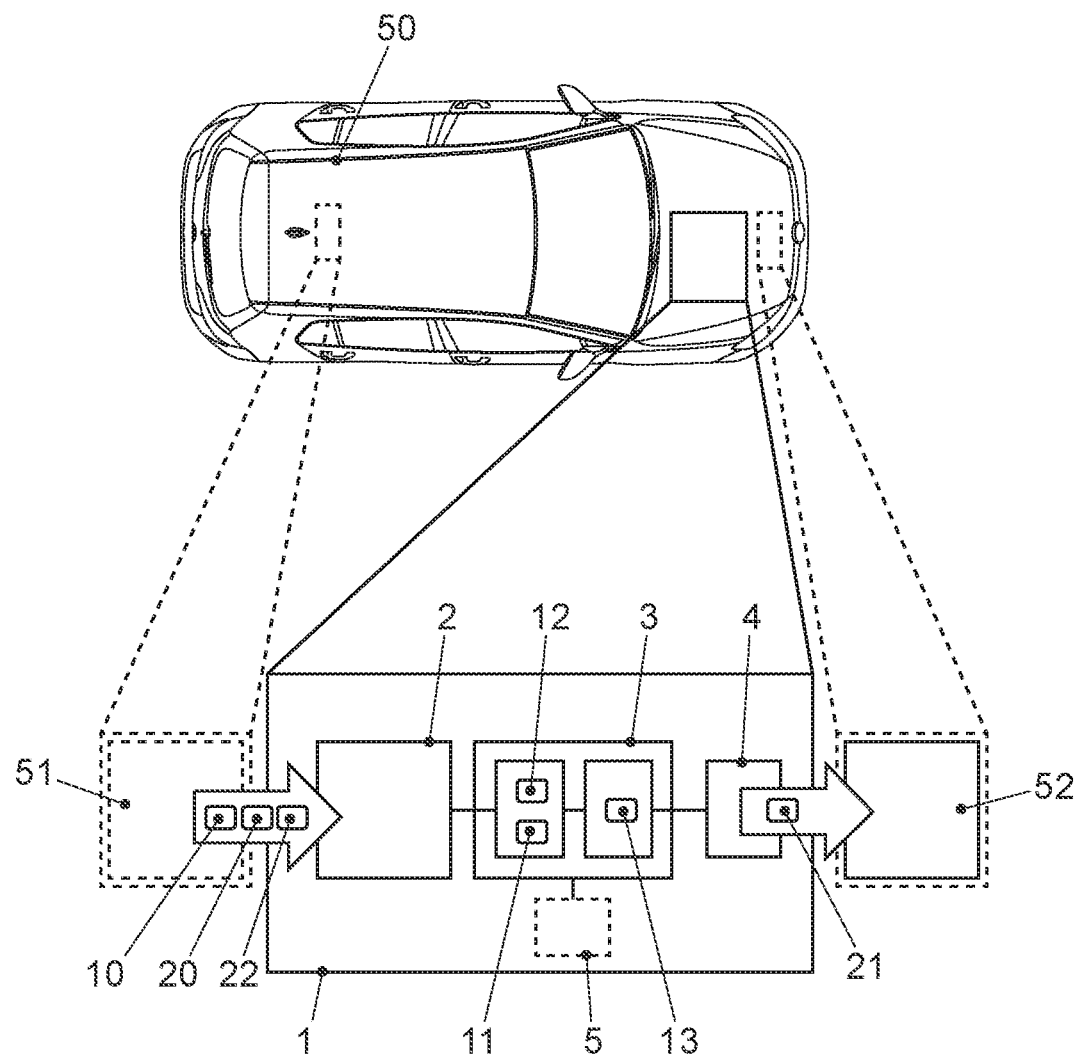
FIG. 1 shows a schematic representation of an embodiment of the device for supporting a lane changing procedure.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method for supporting a lane changing procedure for a vehicle with a cruise control apparatus is provided, wherein the cruise control apparatus adjusts a speed of the vehicle to a target speed, comprising the following steps: receiving environmental data on an environment of the vehicle by an input apparatus, wherein the environmental data at least comprises information on other vehicles in a target lane, determining a current traffic density and a current flow speed in the target lane based on the environmental data an evaluation apparatus, adapting the target speed based on the determined current traffic density and the current flow speed by means of the evaluation apparatus, forwarding the adapted target speed to the cruise control apparatus.

In second exemplary aspect, a device is provided for supporting a lane change procedure for a vehicle with a cruise control apparatus, wherein the cruise control apparatus adjusts a speed of the vehicle to a target speed, comprising an input apparatus, wherein the input apparatus is configured to receive environmental data on an environment of the vehicle, wherein the environmental data at least comprises information on other vehicles in a target lane, an evaluation apparatus, wherein the evaluation apparatus is configured to determine a current traffic density and a current flow speed in the target lane based on the environmental data, and to adapt the target speed based on the determined current traffic density and the current flow speed, and to forward the adapted target speed to the cruise control apparatus.

A basic exemplary idea is to determine a traffic density and a current flow speed from provided environmental data that at least comprise information on other vehicles in a target lane. Traffic density may for example be defined as vehicles per route section or vehicles per time span. The flow speed may be a mean speed, for example an average speed of the vehicles in the target lane, for example the next 2, 5, or 10 vehicles in the environment of the vehicle, without limitation. Depending on the determined current traffic density and the current flow speed, a target speed of a cruise control apparatus of the vehicle is then adapted. If for example an overtaking procedure is planned using a lane as the target lane which lies to the left of the current lane, and if the vehicles in this target lane have a flow speed greater than the current target speed, the target speed is increased to this flow speed and then forwarded to the cruise control apparatus. The vehicle then accelerates and may switch to the target lane and execute the overtaking procedure without hindering the other vehicles in the target lane. Correspondingly, a target speed can be adapted to a slower flow speed when changing lanes to a lane running to the right of the vehicle in order to prevent approaching another vehicle and/or an abrupt deceleration. The adaptation is carried out in particular taking into account a maximum or minimum permissible speed.

A benefit of the teachings herein is that an improved depiction of the environment may be obtained by means of the determined traffic density and the determined flow speed. The adaptation of the target speed may therefore be performed better. For example, all relevant vehicles in the proximity of the vehicle located in the target lane are taken into account, i.e., both other vehicles in front of the vehicle as well as other vehicles behind the vehicle. All vehicles are relevant in this case that can influence the traffic density and the flow speed in the target lane.

The environmental data may for example be sensor data. This may comprise all known sensors, in particular radar, lidar, ultrasound and/or cameras. The environmental data may also be provided through traffic information services and for example already include information on traffic density and/or flow speed in the target lane. Furthermore, environmental data may also be provided through cloud services and/or car-2-X connections.

The method may for example be performed when a lane changing procedure is initiated. This may for example be a lane changing procedure that was manually initiated by a driver. Furthermore, such a lane changing procedure may also be initiated automatically by a semiautomatically or automatically controlled vehicle for example.

The vehicle may for example be a motor vehicle. The vehicle may however also be a transport robot or another land vehicle, watercraft, or aircraft.

Some embodiments provide that the target speed is only adapted when the determined current traffic density in the target lane exceeds a threshold value. If a traffic density is for example only light, i.e., only a very few other vehicles are on a route section of the target lane, it is therefore less important to adapt the speed of the vehicle to a flow speed of the other vehicles in the target lane. If absolutely no other vehicles are in the target lane, an adaptation of the target speed may also be omitted. This may reduce energy consumption since unnecessary acceleration or deceleration can be prevented.

Correspondingly with respect to the device and in some embodiments, it is provided that the evaluation apparatus is furthermore designed to only adapt the target speed if the determined current traffic density in the target lane exceeds a threshold value.

Some embodiments provide that the adapted target speed is reset to the previously active target speed given at least one resetting criterion. Such a resetting criterion may for example be an expired length of time. For example, the target speed may be reset after seconds or one minute. A response from the vehicle may furthermore be a resetting criterion. If the vehicle is for example controlled automatically, a response may be generated by a vehicle control unit that the overtaking procedure has successfully concluded after an overtaking procedure has been performed. As the resetting criterion, the existence of this response is then checked.

The device correspondingly provides in some embodiments that the evaluation apparatus is furthermore designed to reset the adapted target speed to the previously active target speed when at least one resetting criterion exists.

Further embodiments provide that, after forwarding the adapted target speed to the cruise control apparatus, a driver of the vehicle is queried by a man/machine interface whether or not the adapted target speed should remain permanently set, wherein the adapted target speed remains set or is reset corresponding to the result of the query. A man/machine interface may for example be designed as a simple signal transmitter with a button for retaining or resetting. The man/machine interface may however also be designed as a display and operating apparatus on which a corresponding dialog is shown and the driver is asked to make an entry in some embodiments.

The device correspondingly in some embodiments may comprise a man/machine interface, wherein the evaluation apparatus is furthermore designed such that, after the adapted target speed is forwarded to the cruise control apparatus, a driver of the vehicle is queried by the man/machine interface whether or not the adapted target speed should be permanently set, and whether or not to retain or reset the target speed corresponding to the result of the query.

Some embodiments provide that a driver preference is learned based on at least one query result, wherein the adapted target speed is then retained or reset depending on the learned driver preference without any further querying of the driver. It may for example be provided that when the target speed is retained three times, it is subsequently assumed that the driver will also wish to retain an adapted target speed in the future. Correspondingly, a query will be omitted in the future, and the adapted target speed will be retained without further ado. The environmental data may also be taken into account while learning so that the particular environment may also be taken into account.

The device correspondingly and in some embodiments may provide that the evaluation apparatus is furthermore designed to learn a driver preference based on at least one query result and then retain or reset the adapted target speed depending on the learned driver preference without further querying the driver.

Alternatively, it may also be provided in some embodiments that the driver may set from the beginning that the adapted target speed should always remain set, or alternatively only until the existence of a resetting criterion.

Some embodiments provide that the target speed is only adapted if the adapted target speed lies within a given range around the current target speed and/or a current actual speed of the vehicle. The range may be defined to be either absolute or relative. For example, it may be provided that the adapted target speed may only deviate ±10% from the current target speed and/or actual speed of the vehicle.

The device correspondingly in some embodiments may provide that the evaluation apparatus is furthermore designed to only adapt the target speed if the adapted target speed lies within a given range around the current target speed and/or a current actual speed of the vehicle.

In the following, the invention will be explained in greater detail based on further exemplary embodiments and with reference to the drawings.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a schematic representation of an embodiment of the device 1 to support a lane changing procedure. The device 1 is installed in a vehicle 50 that is designed as a motor vehicle. The device 1 comprises an input apparatus 2, an evaluation apparatus 3 and an output apparatus 4.

The vehicle 50 comprises a cruise control apparatus 52 that adjusts a speed of the vehicle 50 to a target speed 20. Furthermore, the vehicle 50 comprises an environmental sensor system 51 that records, prepares and provides environmental data 10 on an environment of the vehicle 50. The environmental sensor system 51 provides the environmental data 10 for example through a data bus system such as a controller area network (CAN) bus to the input apparatus 2.

Furthermore, a current target speed 20 and a current actual speed 22 may also be provided to the device 1 through the data bus system.

The input apparatus 2 receives the provided environmental data 10, wherein the environmental data 10 at least comprise information on other vehicles in a target lane. Furthermore, environmental data 20 from traffic information services, and/or cloud services, or car-2-X connections may also be queried by the input apparatus 2 and provided.

The evaluation apparatus 3 determines a current traffic density 11 and a current flow speed 12 in the target lane based on the environmental data 10. Then the evaluation apparatus 3 adapts the target speed 20 based on the determined current traffic density 11 and the current flow speed 12 so that an adapted target speed 21 can be provided.

The adapted target speed 21 is then forwarded by the evaluation apparatus 3 to the cruise control apparatus 52. This is done through the output apparatus 4 that forwards the adapted target speed 21 for example through the data bus system to the cruise control apparatus 52. The cruise control apparatus 52 then replaces the previous target speed 20 with the adapted target speed 21. The speed of the vehicle 50 is subsequently adjusted by the cruise control apparatus 52 to the adapted target speed 21.

Figure 2:
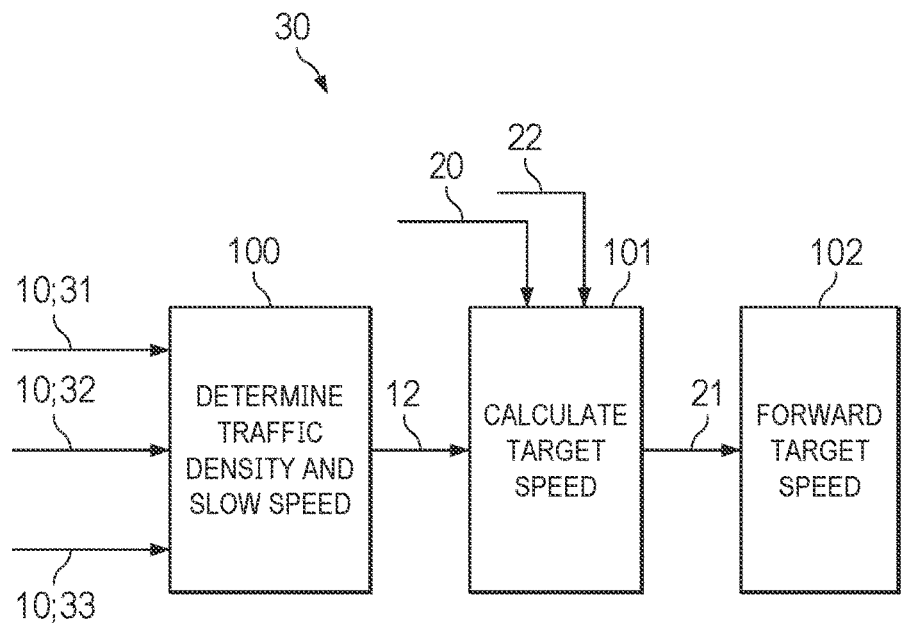
FIG. 2 shows a schematic flowchart of an embodiment.

FIG. 2 shows a schematic flow chart 30 to explain the present embodiment. Based on received environmental data 10 that may exist as sensor data 31, traffic information data 32 and/or cloud data/car-2-X data 33, a traffic density 11 and a current flow speed 12 in the target lane are determined in a first method step 100. Then an adapted target speed 21 is calculated in method step 101 taking into account the current target speed 20 and the current actual speed 22 based on the current flow speed 12 and the current traffic density 11. If the current target speed 20 is for example less than the flow speed 12, the target speed 20 is correspondingly increased. If the current target speed 20 is contrastingly greater than the flow speed 12, the target speed 20 is correspondingly reduced.

The current actual speed 22 is for example taken into account when calculating a difference between the current target speed 20 and adapted target speed 21. If the adapted target speed 21 lies closer to the current actual speed 22, a subsequent acceleration or deceleration can be correspondingly smaller so that fuel can be saved. This can be taken into account when adapting the current target speed 20.

The adapted target speed 21 is then forwarded in method step 102 to the cruise control apparatus of the vehicle. The cruise control apparatus then replaces the current target speed 20 with the adapted target speed 21.

It may be provided that the target speed 20 is only adapted if the determined current traffic density 11 in the target lane exceeds a threshold value. For example, the threshold value can define a certain number of other vehicles per route section or per time interval. Only when the threshold value is exceeded is the target speed 20 adapted, and the adapted target speed 21 is forwarded to the cruise control apparatus.

Furthermore, it may be provided that the adapted target speed 20 is reset to the previously active target speed 20 when at least one resetting criterion 13 (FIG. 1) exists. Such a resetting criterion 13 may for example be the expiration of a given length of time. After the expiration of the given length of time, the resetting criterion 13 is met, and the evaluation apparatus 3 resets the adapted target speed 21 to the original target speed 20. To this end, the evaluation apparatus 3 correspondingly forwards the original value of the target speed 20 as an adapted target speed 21 to the cruise control apparatus 52 of the vehicle 50. Alternatively or in addition, a successfully executed overtaking procedure can also be used as the resetting criterion 13.

Figure 3:
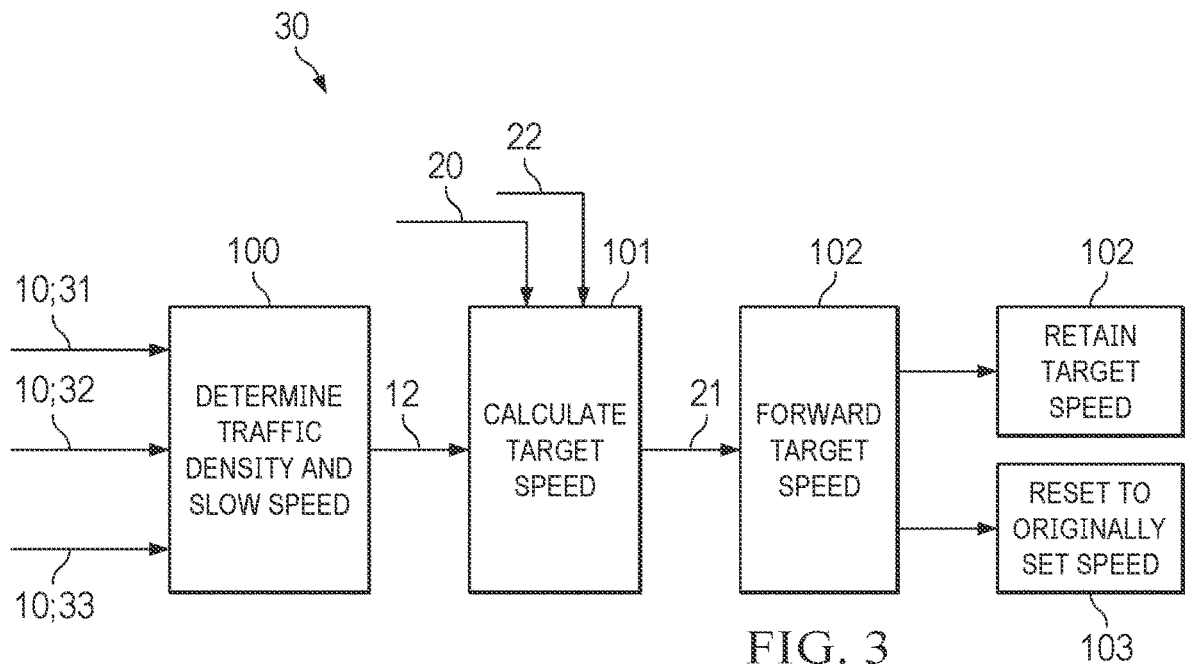
FIG. 3 shows a schematic flowchart of another embodiment.

It can furthermore be provided that, after the adapted target speed 21 is forwarded to the cruise control apparatus, a driver of the vehicle can be queried by a man/machine interface 5 (see FIG. 1) whether or not the adapted target speed 21 should remain permanently set, wherein the adapted target speed 21 remains set or is reset corresponding to the result of the query. This is schematically illustrated in FIG. 3, wherein FIG. 3 basically corresponds to FIG. 2. The query of the man/machine interface 5 occurs after the adapted target speed 21 has been forwarded to the cruise control apparatus. Depending on the query result, the adapted target speed 21 is permanently retained in method step 102, or reset to the originally set target speed 20 in method step 103 by forwarding the original target speed 20 to the cruise control apparatus.

Figure 4:
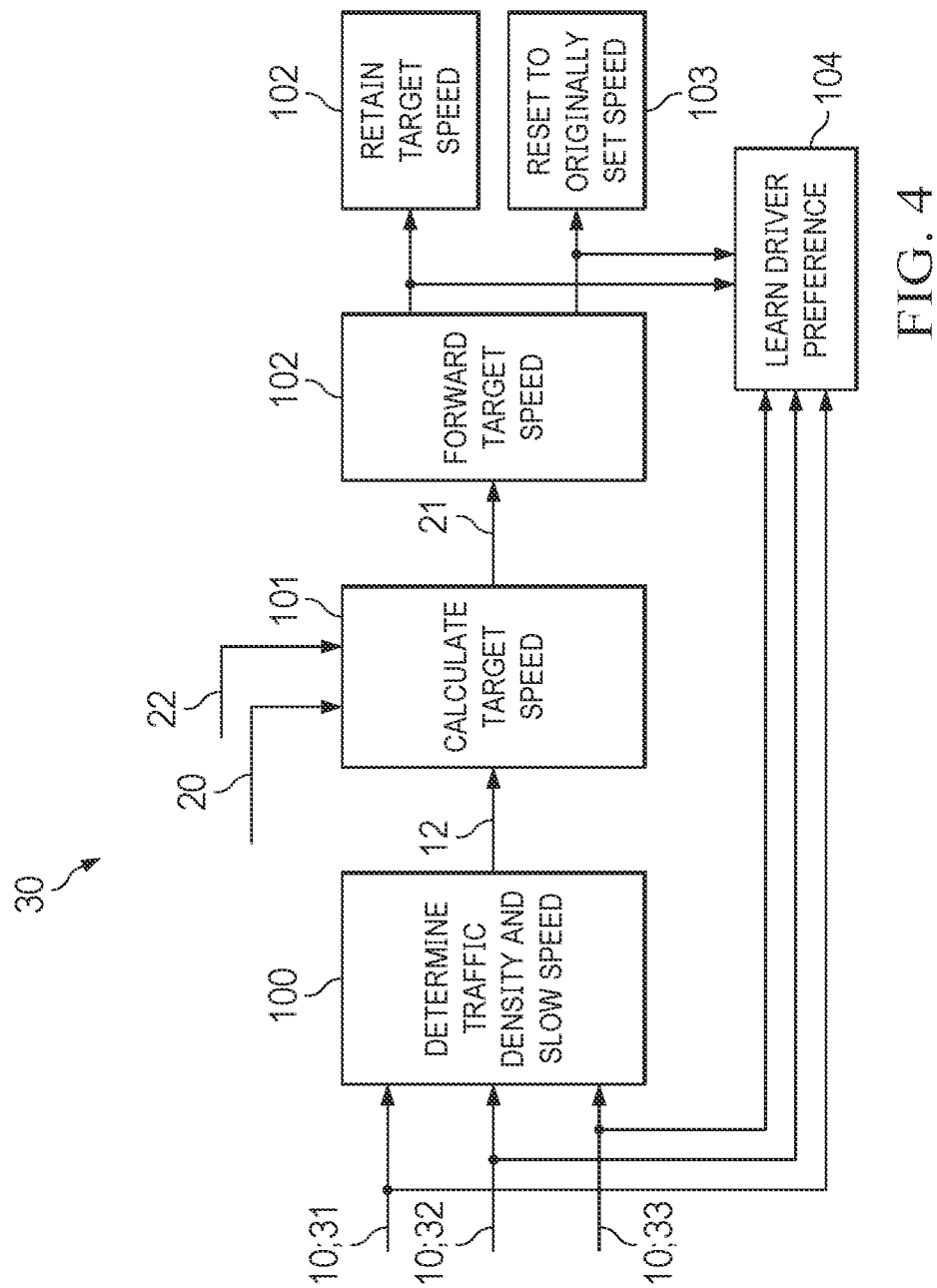
FIG. 4 shows a schematic flowchart of another embodiment.

A development can furthermore provide that a driver preference is learned based on at least one query result, wherein the adapted target speed 21 is then retained or reset depending on the learned driver preference without any further querying of the driver. This is schematically shown in FIG. 4, wherein FIG. 4 is based on FIG. 3. Method step 104 is additionally executed in which the driver preference is learned. This may also be done taking into account the environmental data 10. Once the driver preference has been learned, the query of the driver and method steps 102, 103 are no longer performed.

It may be provided that the target speed 20 is only adapted if the adapted target speed 21 lies within a given range around the current target speed 20 and/or a current actual speed 22 of the vehicle.

LIST OF REFERENCE NUMERALS

1 Device
2 Input apparatus
3 Evaluation apparatus
4 Output apparatus
5 Man/machine interface
10 Environmental data
11 Current traffic density
12 Current flow speed
13 Resetting criterion
20 Current target speed
21 Adapted target speed
22 Current actual speed
30 Information flowchart
31 Sensor data
32 Traffic information
33 Cloud data/Car-2-X data
50 Vehicle
51 Environment sensor system
52 Cruise control apparatus
100-104 Method steps The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not

What is claimed is:

1. A method for supporting a lane changing procedure for a vehicle with a cruise control apparatus, wherein the cruise control apparatus adjusts a speed of the vehicle to a target speed, comprising:
   receiving environmental data on an environment of the vehicle, wherein the environmental data comprise at least information on other vehicles in a target lane, which target lane is different than a current lane in which the vehicle is located;
   determining a current traffic density and a current flow speed in the target lane based on the environmental data;
   adapting the target speed based on the determined current traffic density and the determined current flow speed at least in the target lane to facilitate the lane changing procedure; and
   providing the adapted target speed to the cruise control apparatus.

2. The method of claim 1, wherein the target speed is only adapted if the determined current traffic density in the target lane exceeds a threshold value.

3. The method of claim 2, wherein the adapted target speed is reset to the previously active target speed when at least one resetting criterion exists.

4. The method of claim 2, further comprising, after the adapted target speed is provided to the cruise control apparatus, querying a driver whether or not the adapted target speed should remain permanently set, wherein the adapted target speed remains set or is reset corresponding to the result of the query.

5. The method of claim 4, further comprising learning a driver preference based on at least one query result, wherein the adapted target speed is then retained or reset depending on the learned driver preference without further querying of the driver.

6. The method of claim 2, wherein the target speed is only adapted if the adapted target speed lies within a given range around the current target speed and/or a current actual speed of the vehicle.

7. The method of claim 1, wherein the adapted target speed is reset to the previously active target speed when at least one resetting criterion exists.

8. The method of claim 7, further comprising, after the adapted target speed is provided to the cruise control apparatus, querying a driver whether or not the adapted target speed should remain permanently set, wherein the adapted target speed remains set or is reset corresponding to the result of the query.

9. The method of claim 8, further comprising learning a driver preference based on at least one query result, wherein the adapted target speed is then retained or reset depending on the learned driver preference without further querying of the driver.

10. The method of claim 7, wherein the target speed is only adapted if the adapted target speed lies within a given range around the current target speed and/or a current actual speed of the vehicle.

11. The method of claim 1, further comprising, after the adapted target speed is provided to the cruise control apparatus, querying a driver whether or not the adapted target speed should remain permanently set, wherein the adapted target speed remains set or is reset corresponding to the result of the query.

12. The method of claim 11, further comprising learning a driver preference based on at least one query result, wherein the adapted target speed is then retained or reset depending on the learned driver preference without further querying of the driver.

13. The method of claim 1, wherein the target speed is only adapted if the adapted target speed lies within a given range around the current target speed and/or a current actual speed of the vehicle.

14. A device for supporting a lane changing procedure for a vehicle with a cruise control apparatus, wherein the cruise control apparatus adjusts a speed of the vehicle to a target speed, comprising:
   an input apparatus, wherein the input apparatus is configured to receive environmental data on an environment of the vehicle, wherein the environmental data at least comprises information on other vehicles in a target lane, which target lane is different than a current lane in which the vehicle is located;
   an evaluation apparatus, wherein the evaluation apparatus is configured to determine a current traffic density and a current flow speed in the target lane based on the environmental data, and to adapt the target speed based on the determined current traffic density and the determined current flow speed at least in the target lane to facilitate the lane changing procedure, and to provide the adapted target speed to the cruise control apparatus.

15. The device of claim 14, wherein the evaluation apparatus is furthermore configured to only adapt the target speed if the determined current traffic density in the target lane exceeds a threshold value.

16. The device of claim 15, wherein the evaluation apparatus is furthermore configured so that the adapted target speed is reset to the previously active target speed when at least one resetting criterion exists.

17. The device of claim 15, wherein the device comprises a man/machine interface, wherein the evaluation apparatus is furthermore configured such that, after the adapted target speed is provided to the cruise control apparatus, a driver of the vehicle is queried by the man/machine interface whether or not the adapted target speed should be permanently set, and whether or not to retain or reset the target speed corresponding to the result of the query.

18. The device of claim 14, wherein the evaluation apparatus is furthermore configured so that the adapted target speed is reset to the previously active target speed when at least one resetting criterion exists.

19. The device of claim 18, wherein the device comprises a man/machine interface, wherein the evaluation apparatus is furthermore configured such that, after the adapted target speed is provided to the cruise control apparatus, a driver of the vehicle is queried by the man/machine interface whether or not the adapted target speed should be permanently set, and whether or not to retain or reset the target speed corresponding to the result of the query.

20. The device of claim 14, wherein the device comprises a man/machine interface, wherein the evaluation apparatus is furthermore configured such that, after the adapted target speed is provided to the cruise control apparatus, a driver of the vehicle is queried by the man/machine interface whether or not the adapted target speed should be permanently set, and whether or not to retain or reset the target speed corresponding to the result of the query.

* * * * *